United States Patent [19]

Aebersold

[11] Patent Number: 5,062,189
[45] Date of Patent: Nov. 5, 1991

[54] DEVICE FOR PROFILING AN ELECTRODE ROLLER

[75] Inventor: Hans Aebersold, Birmensdorf, Switzerland

[73] Assignee: Elpatronic AG, Zug, Switzerland

[21] Appl. No.: 668,076

[22] Filed: Mar. 12, 1991

[30] Foreign Application Priority Data

May 2, 1990 [CH] Switzerland ............... 01484/90

[51] Int. Cl.⁵ .................... B23P 6/00; B23C 3/12
[52] U.S. Cl. ..................... 29/33 R; 51/251; 82/131; 409/140
[58] Field of Search ............ 29/33 R, 33 A, 28, 27 B, 29/27 A, 50; 409/140, 180, 179, 165; 82/131, 128, 153; 219/84, 119; 51/251, 254

[56] References Cited

U.S. PATENT DOCUMENTS

| 2,467,027 | 4/1949 | Glandis | 51/251 X |
| 2,589,191 | 3/1952 | Laase | 51/254 |
| 3,839,941 | 10/1974 | Adams | 409/180 |

FOREIGN PATENT DOCUMENTS

| 17379 | 1/1986 | Japan | 219/84 |
| 764950 | 9/1980 | U.S.S.R. | 409/140 |
| 610617 | 10/1948 | United Kingdom | 51/251 |
| 2021019 | 11/1979 | United Kingdom | 409/179 |

Primary Examiner—William Briggs
Attorney, Agent, or Firm—McCormick, Paulding & Huber

[57] ABSTRACT

A profiling tool is mounted on a tool slide which can be moved radially towards the electrode roller (10) by means of a feed drive. A feeler slide which carries a feeler can move parallel to the tool slide and is biassed towards the electrode roller. Relative movements of the tool slide with respect to the feeler slide, and thus the depth of feed of the profiling tool into the electrode roller, are limited by an adjustable limit stop (76). The tool slide can be stopped by means of a clamping device as soon as the predetermined depth of feed of the profiling tool is reached. The setting of the profiling tool automatically adapts to the diameter of the electrode roller, which decreases with repeated profiling.

6 Claims, 4 Drawing Sheets

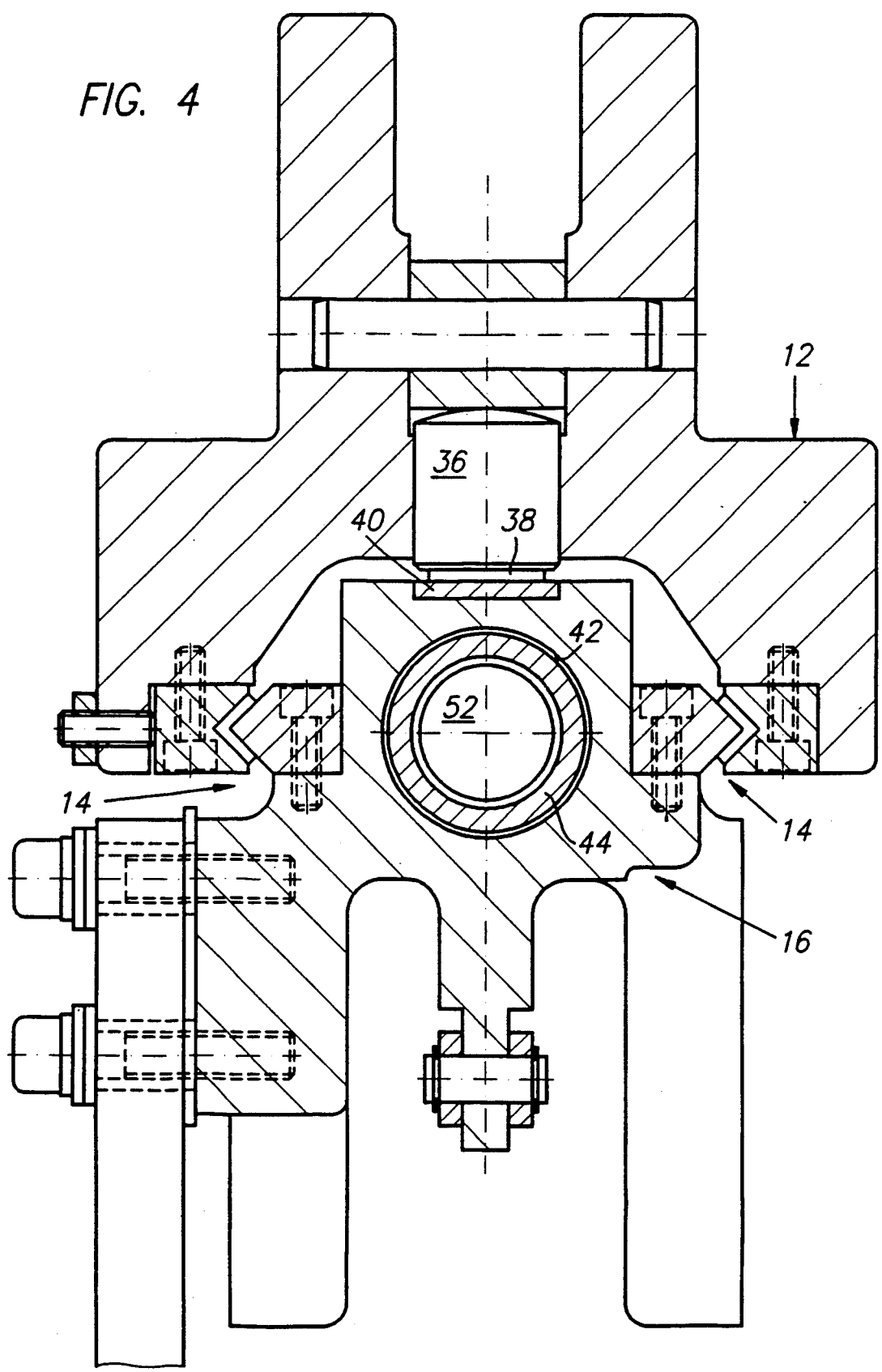

DEVICE FOR PROFILING AN ELECTRODE ROLLER

BACKGROUND OF THE INVENTION

The invention relates to a device for profiling an electrode roller, with
a tool slide which can be moved approximately radially backwards and forwards in relation to the electrode roller by means of a feed drive, and
at least one profiling tool which is mounted on the tool slide.

SUMMARY OF THE INVENTION

The object of the invention is to create a device of this type which adapts in a particularly simple way to the diameter of the electrode roller, which diameter gradually decreases during the lifetime of the electrode roller.

This object is achieved according to the invention by means of
a feeler slide which carries a feeler which can move parallel to the tool and is biassed towards the electrode roller,
an adjustable limit stop which limits the relative movement of the tool slide in relation to the feeler slide, and which thus limits the depth of feed of the profiling tool into the electrode roller, and
a clamping device with which the tool slide can be stopped as soon as the preset depth of feed of the profiling tool has been reached.

Advantageous further forms of the invention result from the subsidiary claims.

BRIEF DESCRIPTION OF THE DRAWINGS

The invention is explained in more detail below by means of schematic drawings, where:

FIG. 4 is the Section IV—IV from FIG. 1.

DESCRIPTION OF THE PREFERRED EMBODIMENTS

Figure 1:
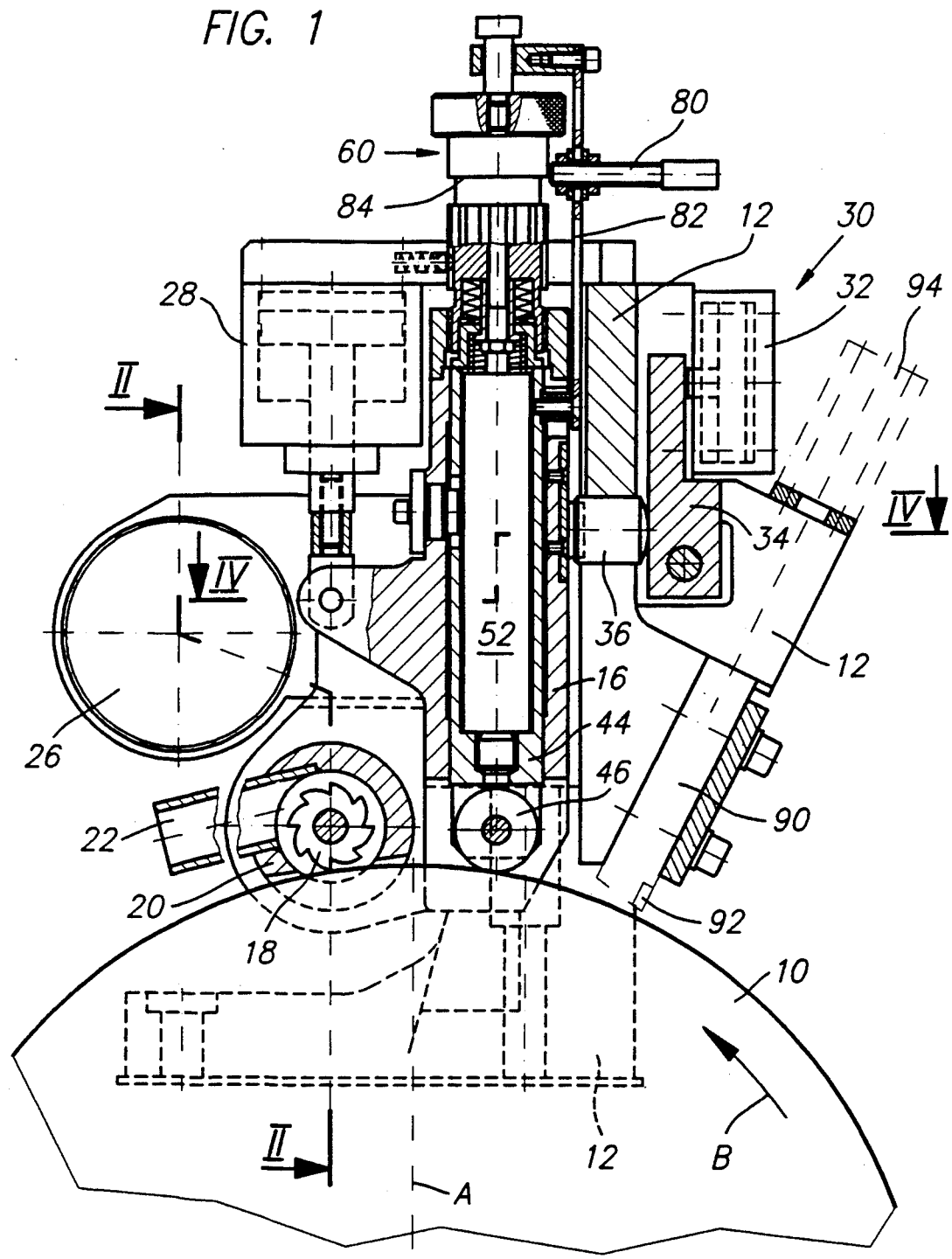
FIG. 1 is a device for profiling an electrode roller, as seen in a section normal to the axis of the electrode roller.

The device illustrated is associated with an electrode roller 10 of an electrical resistance welding machine which operates with two such electrode rollers, and has the function of cleaning and re-shaping the outer surface of the electrode roller 10 from time to time, which surface becomes worn and soiled with the welding. The second electrode roller, which is not shown in the drawing, may be associated with a device which corresponds exactly to that shown in FIGS. 1 to 4.

The device illustrated has a post 12 which is fastened in the usual way onto or near a bearing and drive housing for the electrode roller 10, not shown in the drawing. Guides 14, which are shown in the drawing as V-guides, are provided on the post 12, and extend parallel to and at a short distance from an axial plane A which contains the axis of the electrode roller 10. A tool slide 16 is guided along the guides 14; a profiling tool 18, which in the example shown is a profile milling cutter, is located on the tool slide 16.

The profile tool 18 is surrounded as far as possible by a housing 20, which has a suction connection 22 for the removal by suction of pieces of chips which are produced during the profiling of the electrode roller 10.

The profiling tool 18 can be driven by a motor 26 via a toothed belt drive 24. The motor 26 is fastened to the tool slide 16 and is preferably a continuously variable speed electric motor.

The tool slide 16 is fed by a feed drive 28; in the example illustrated this is a pneumatic or hydraulic piston-cylinder unit, the stroke of which is long enough to adapt the operating position of the tool slide to the diameter of the electrode roller, which diameter decreases during the life of the electrode roller, without additional mechanical adjustment.

A clamping device 30 is provided, to stop the tool slide 16 in any possible operating position. This is associated with a pneumatic or hydraulic piston-cylinder unit 32 fastened to the post 12, which acts, via a lever 34 mounted on the post 12, on a shaft 36 which is guided in the pillar 12 and can move normal to the direction of movement of the tool slide 16. The shaft 36 has a frictional lining 38, which can be pressed against a clamping plate 40 which is made of hardened steel and fastened to the tool slide 16.

The tool slide 16 has a guide bore 42 parallel to its guides 14, in which a feeler slide 44 is guided and can move. A feeler 46 in the shape of a roller is located at the end of the feeler slide 44 adjacent to the electrode roller. The diameter of the feeler 46 corresponds to the diameter of the milling cutter which forms the profiling tool 18. The feeler slide 44 is in the form of a cylindrical sleeve with an oblong hole 48, in which a peg 50 fastened to the tool slide engages so that the feeler slide 44 cannot rotate around its axis. By this means it is ensured that the axis of rotation of the roller forming the feeler 46 always remains parallel to the axis of the electrode roller 10.

A hydraulic braking device 52, in the form of a cylinder of the usual commercially available type, is incorporated in the feeler slide 44; a connecting-rod 54 projects from the upper end of this braking device remote from the electrode roller 10, as shown in FIG. 1. The end of the connecting-rod is in contact with the head of a bolt 56, which extends through a spacer sleeve 58 and is fastened together with the latter to a adjustment piece 60. The adjustment piece 60 is bell-shaped at its lower region, as shown in FIG. 1, and has a fine external thread 62 which is screwed into a cap 64 fastened to the tool slide 16.

Figure 2:
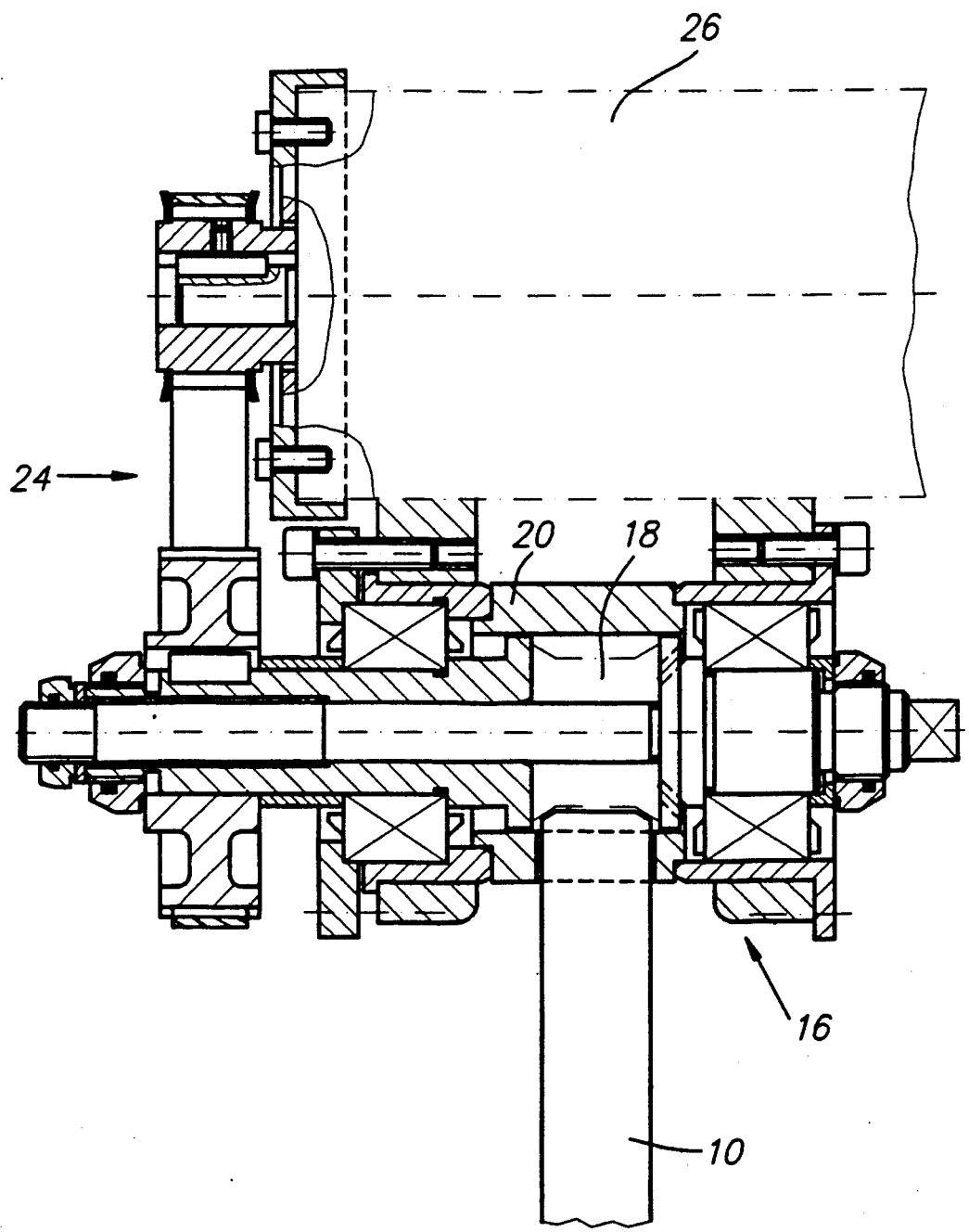
FIG. 2 is the Section II—II from FIG. 1.
Figure 3:
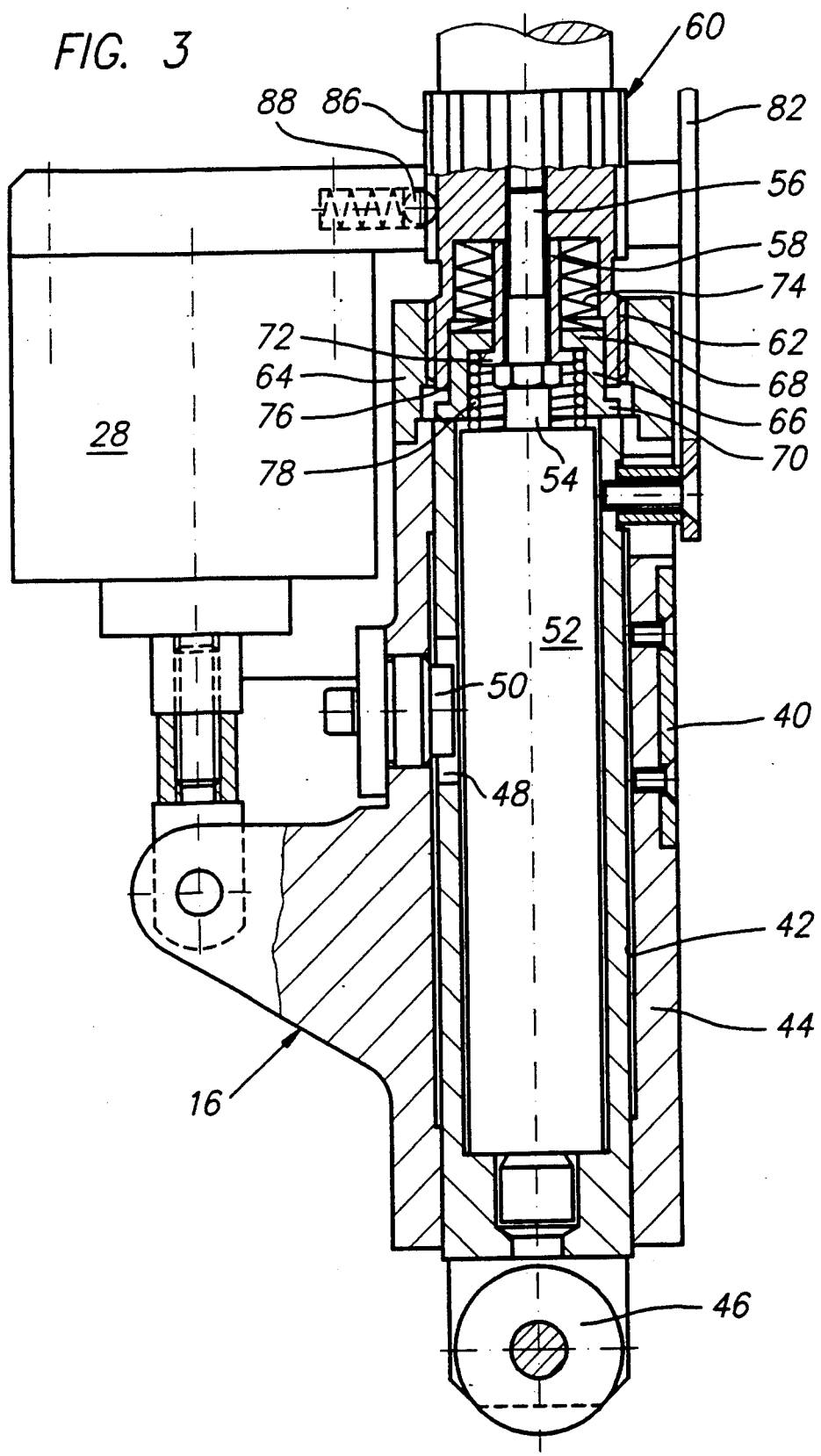
FIG. 3 is an enlarged section from FIG. 1

A similarly bell-shaped connecting member 66, which can move axially, is guided in the bell-shaped lower region of the adjustment piece 60. As shown in FIG. 2, this connecting member 66 has a collar 68 projecting inwards at its upper end and a basal flange 70 projecting radially outwards at its lower end. The spacer sleeve 58 likewise has a basal flange 72 which projects radially outwards, which flange is disposed under the collar 68 of the connecting member 66, as shown in FIG. 1, and thus limits the path along which the connecting member 66 can move downwards in relation to the adjustment piece 60.

A spring arrangement 74 is mounted between the adjustment piece 60 and the connecting member 66; in the example illustrated this is formed as a spring washer assembly. The pre-load of the spring arrangement 74 is transmitted to the feeler slide 44 via the basal flange 70 of the connecting member 66.

The highest possible setting of the feeler slide 44 in relation to the tool slide 16 is determined by the setting of the adjustment piece 60, which is screwed into the cap 64 to a greater or lesser extent, and the lower edge of which forms a limit stop 76 for the basal flange 70 of the connecting member 66.

A helical compression spring 78 is disposed inside the bell-shaped end of the connecting member 66, and presses on the feeler slide 44 via the cylinder of the braking device 52, so that the feeler slide 44 always attempts to take up its deepest possible position, as determined by the length and location of the oblong hole 48.

The position which the tool slide 16 takes up in relation to the feeler slide 44 for a given setting of the adjustment piece 60 is monitored by a sensor 80, which is fastened to the feeler slide 44 by means of a rod 82, and which sends out a signal as soon as a shoulder 84 incorporated in the adjustment piece 60 takes up a position corresponding to the desired depth of penetration of the shaping tool 18 into the electrode roller 10. The clamping device 30 is activated by this signal.

In order that the adjustment piece 60 cannot move unintentionally, it has a collar of locking grooves 86 arranged parallel to its axis and arranged at equal angular distances from each other, in which a springloaded ball 88, which is radially guided in the pillar, can seat.

The profiling tool 18 and the feeler 46 are arranged symmetrically with respect to the axial plane A so that each point on the circumference of the electrode roller, which rotates in the direction of the arrow in FIG. 1, is sensed by the feeler 46 before it reaches the profiling tool 18. So that the setting of the feeler 46 is not subject to error due to welding beads or other impurities which can adhere to the outer surface of the electrode roller 10, a scraping tool 90 is disposed in front of the feeler 46, which extends radially to the electrode roller 10 and has a cutting edge formed of a hard metal tip, as in lathe tools of conventional type. The scraping tool 90 is guided radially in the post 12 to be movable towards the electrode roller 10, and can be pressed with a predetermined force against the outer surface of the electrode roller by means of a pneumatic or hydraulic piston-cylinder unit 94.

When the device illustrated is in the off-position, none of its components can touch the electrode roller 10. If the latter has to be re-shaped from time to time, for example after a predetermined number of welding operations, the feed drive 28 is pressurized so that it moves the tool slide 16 radially towards the electrode roller 10, i.e. downwards according to FIG. 1. The rest position of the feeler slide 44 in relation to the tool slide 16 is selected so that the feeler 46 abuts the outer surface of the electrode roller when the tool slide 16 moves, whilst the profiling tool 18 is still at a distance of preferably several millimetres from the electrode roller 10.

The feeler 46 then prevents further movement of the feeler slide 44, so that only the tool slide 16 now moves towards the axis of the electrode roller 10. At the same time the spring 78 is compressed until the basal flange 70 of the connecting member is seated on the feeler slide 44. Up to that point the tool slide 16 moves at high speed. Then the bell-shaped lower end of the adjustment piece 60 moves progressively over the connecting member 66, whereupon the spring arrangement 74 is compressed. The connecting-rod 54 is simultaneously pressed into the braking device 52, and the latter slows down the further movement of the tool slide 16 so that the profiling tool 18, which is driven by the motor 26, is gently pressed into the electrode roller 10. The remaining path which the tool slide 16 can now travel against the resistance of the spring arrangement 74 and the braking device 52 is determined by the distance originally set between the limit stop 76 and the basal flange 70 of the connecting member 66.

The scraping tool 90 is preferably activated by the piston-cylinder unit 94 in such a way that it reaches the outer surface of the electrode roller before the feeler 46, and cleans the surface before the feeler becomes effective.

I claim:

1. A device for profiling an electrode roller, with
   a tool slide which can be moved approximately radially backwards and forwards in relation to the electrode roller by means of a feed drive, and
   at least one profiling tool which is mounted on the tool slide, characterized by
   a feeler slide which carries a feeler which can move parallel to the tool and is biassed towards the electrode roller,
   an adjustable limit stop which limits the relative movement of the tool slide in relation to the feeler slide, and which thus limits the depth of feed of the profiling tool into the electrode roller, and
   a clamping device with which the tool slide can be stopped as soon as the preset depth of feed of the profiling tool has been reached.

2. The device according to claim 1, characterized in that the clamping device is controlled by a sensor which monitors the relative movements of the tool slide in relation to the feeler slide.

3. The device according to claim 1, characterized in that the profiling tool and the feeler are arranged symmetrically with respect to a plane (A) which contains the axis of the electrode roller.

4. The device according to claim 3, characterized in that the profiling tool is a milling cutter and the feeler is a sensing roller in rolling contact with the circumference of the electrode roller, where the diameter of the sensing roller corresponds to that of the milling cutter.

5. The device according to claim 1, characterized in that the tool slide is supported at the feeler slide by means of a braking device, with which the relative movement of the tool slide towards the electrode roller with respect to the feeler slide can be slowed down.

6. The device according to claim 1, characterized in that a scraping tool is disposed in front of the shaping tool with respect to the direction of rotation of the electrode roller, which scraping tool can be pressed against the electrode roller under a constant pressure.

* * * * *